United States Patent [19]

Henson

[11] Patent Number: 5,653,504

[45] Date of Patent: Aug. 5, 1997

[54] INTEGRATED CHILD SEAT WITH AUTOMATIC CHILD SIZE ACCOMMODATION

[75] Inventor: Kermit T. Henson, LaPeer, Mich.

[73] Assignee: Atoma International Inc., Markham, Canada

[21] Appl. No.: 387,430

[22] Filed: Feb. 10, 1995

[51] Int. Cl.$^6$ .................................................... A47C 15/00
[52] U.S. Cl. ........................... 297/238; 297/467; 297/484
[58] Field of Search ...................................... 297/238, 105, 297/108, 112, 219.12, 256.15, 232, 467, 475, 476, 484, 487, 488

[56] References Cited

U.S. PATENT DOCUMENTS

| | | |
|---|---|---|
| 4,655,503 | 4/1987 | Kamijo et al. ........................ 297/238 |
| 4,858,997 | 8/1989 | Shubin .............................. 297/467 X |
| 5,135,285 | 8/1992 | Dukatz et al. . |
| 5,224,756 | 7/1993 | Dukatz et al. . |
| 5,332,284 | 7/1994 | Elton et al. ........................... 297/238 |
| 5,449,223 | 9/1995 | Miculici et al. ....................... 297/484 |
| 5,468,046 | 11/1995 | Weber et al. .......................... 297/238 |
| 5,503,461 | 4/1996 | Schreier . |

*Primary Examiner*—Laurie K. Cranmer
*Attorney, Agent, or Firm*—Cushman Darby & Cushman IP Group of Pillsbury Madison & Sutro LLP

[57] ABSTRACT

A vehicle seat integrated to selectively provide an adult seat in an adult seat mode and a child's seat in a child seat mode, the child's seat including a child's seat belt assembly including a pair of shoulder belts extending from the cushioned child's seat back over the shoulders of a child in a sitting position on the cushioned child's seat. Each of the shoulder belts when the child's seat belt assembly is in a restraint condition including a generally straight portion which extends forwardly from a position rearwardly of a support surface provided by the child's seat back through a space in the cushioned child's seat back accommodating the same to a position adjacent the child's shoulder. The child's seat belt assembly is constructed and arranged to automatically accommodate any particular child within a nominal size range between a 20-pound child and a 60-pound child without the straight portions having any appreciable forwardly and upwardly extent even for a 60-pound child or any appreciable ear interference even for a 20-pound child. The child's seat belt assembly is constructed and arranged to accomplish the aforesaid automatic accommodation by restricting the straight portions to extend forwardly from the support surface automatically from progressively lower levels at progressively greater angles to the horizontal as the particular child held in the restraint condition of the child's seat belt assembly is of progressively diminishing size within the range.

19 Claims, 10 Drawing Sheets

INTEGRATED CHILD SEAT WITH AUTOMATIC CHILD SIZE ACCOMMODATION

This invention relates to vehicle integrated child seats and more particularly to the manner in which such seats are constructed to accommodate a range of children sizes.

BACKGROUND OF THE INVENTION

The need to accommodate a fairly large size range is particularly important in integrated child seats because they are built into the vehicle seat and therefore cannot be easily removed and replaced by a larger model as can be done with stand alone child seats.

U.S. Pat. No. 5,224,756 discloses an early commercially available integrated child seat which illustrates one manner of accommodating a size range of between a 20-pound child and a 40-pound child. The integrated child seat itself is a modular unit capable of being mounted between two horizontally spaced seat back bolsters provided on a seat back frame assembly suitably mounted with respect to the seat cushion assembly. The modular unit included a main back panel on which upper and lower movable cushion assemblies are mounted. When disposed in an adult seat mode, the upper and lower movable cushion assemblies provide cushions which fill in the space between the bolsters. In the child seat mode, the lower cushion assembly is pivoted downwardly to rest on the seat cushion assembly to provide the child's seat and the upper movable cushion assembly is pivoted upwardly and locked therein to provide the child's head support. A removable pad is removably secured to the upper surface of the child's seat and along the rigid back panel to provide therewith a cushioned child's back support.

A child's seat belt assembly is provided solely to accommodate children of smaller size. In order to accommodate the larger child, the child's seat belt assembly is stored behind the removable pad and the adult seat belt assembly is used. The child's seat belt assembly provided is of the five-point type including shoulder belts which extend through a pair of horizontally spaced and horizontally aligned openings in the rigid back panel. The shoulder belts extend from the openings behind the rigid back panel and are combined into a single belt which ultimately extends out of the front of the lower movable cushion assembly through a one-way lock therein which permits the shoulder belts to be adjusted to accommodate the particular small child being restrained.

A more commonly used manner of accommodating a large size range of children in an integrated child seat, particularly where the seat back is higher than the usual van rear bench seat, is to provide a series of vertically spaced pairs of horizontally spaced and horizontally aligned openings through which the shoulder belts can be selectively extended. An example of this type of accommodation is disclosed in U.S. Pat. No. 5,135,285.

BRIEF DESCRIPTION OF THE INVENTION

An object of the present invention is to provide an integrated child seat which will automatically accommodate a large size range of children in a passive manner without the necessity to make any adjustments. In accordance with the principles of the present invention, this objective is obtained by providing a seat cushion assembly constructed and arranged to be mounted on a vehicle in a position to enable an adult occupant of the vehicle to sit thereon in an operative position. A seat back support assembly is mounted with respect to the seat cushion assembly so as to be disposed in an operative fixed relation therewith. Side cushions are carried by the seat back support assembly in positions spaced apart a distance sufficient to define a child receiving space between the side cushions of a size to enable a child to be disposed between the side cushions. A plurality of cushion assemblies are mounted on the seat back support assembly including a movable cushion assembly constructed and arranged with respect to the seat back support assembly to be moved between (1) an adult mode position wherein the plurality of cushion assemblies including the movable cushion assembly are disposed within the space between the side cushions and provide therewith a cushioned adult back support for engaging the back of an adult seat occupant sitting on the seat cushion assembly, and (2) a child mode position wherein the movable cushion assembly extends from the space between the side cushions in overlying relation to the seat cushion assembly and the plurality of cushion assemblies including the movable cushion assembly provide a cushioned child's seat extending from the bottom of the space in overlying relation to the seat cushion assembly, a cushioned child's seat back extending upwardly from the cushioned child's seat within the space between the side cushions providing a support surface when engaged by the child's back, and a cushioned child's head support above the cushioned child's seat back. A child's seat belt assembly is provided which is constructed and arranged to be operable when the movable seat assembly is in the child mode position thereof to be manually moved between (1) a restraint condition enabling a child in a sitting position on the cushioned child's seat to be restrained thereby and (2) a released condition enabling (A) entry of a child into a sitting position on the cushioned child's seat preparatory to restraint or (B) exit of a child from a sitting position on the cushioned child's seat after restraint. The child's seat belt assembly includes a pair of shoulder belts extending from the cushioned child's seat back over the shoulders of a child in a sitting position on the cushioned child's seat. Each of the shoulder belts when the child's seat belt assembly is in the restraint condition includes a generally straight portion which extends forwardly from a position rearwardly of the support surface through a space in the cushioned child's seat back accommodating the same to a position adjacent the child's shoulder. The child's seat belt assembly is constructed and arranged to automatically accommodate any particular size child within a predetermined range without the straight portions having any appreciable forwardly and upwardly extent even for a largest child within the range or any appreciable ear interference even for a smallest child within the range. The child's seat belt assembly is constructed and arranged to accomplish the aforesaid automatic accommodation by restricting the straight portions to extend forwardly to the support surface automatically from progressively lower levels at progressively greater angles to the horizontal as the particular child held in the restraint condition of the child's seat belt assembly is of progressively diminishing size within the range.

Another object of the present invention is to provide an integrated child seat which is effective in operation, simple in construction and economical to manufacture and maintain.

These and other objects of the present invention will become more apparent during the course of the following detailed description and appended claims.

The invention may best be understood with reference to the accompanying drawings wherein an illustrative embodiment is shown.

DETAILED DESCRIPTION OF THE DRAWINGS

Figure 1:
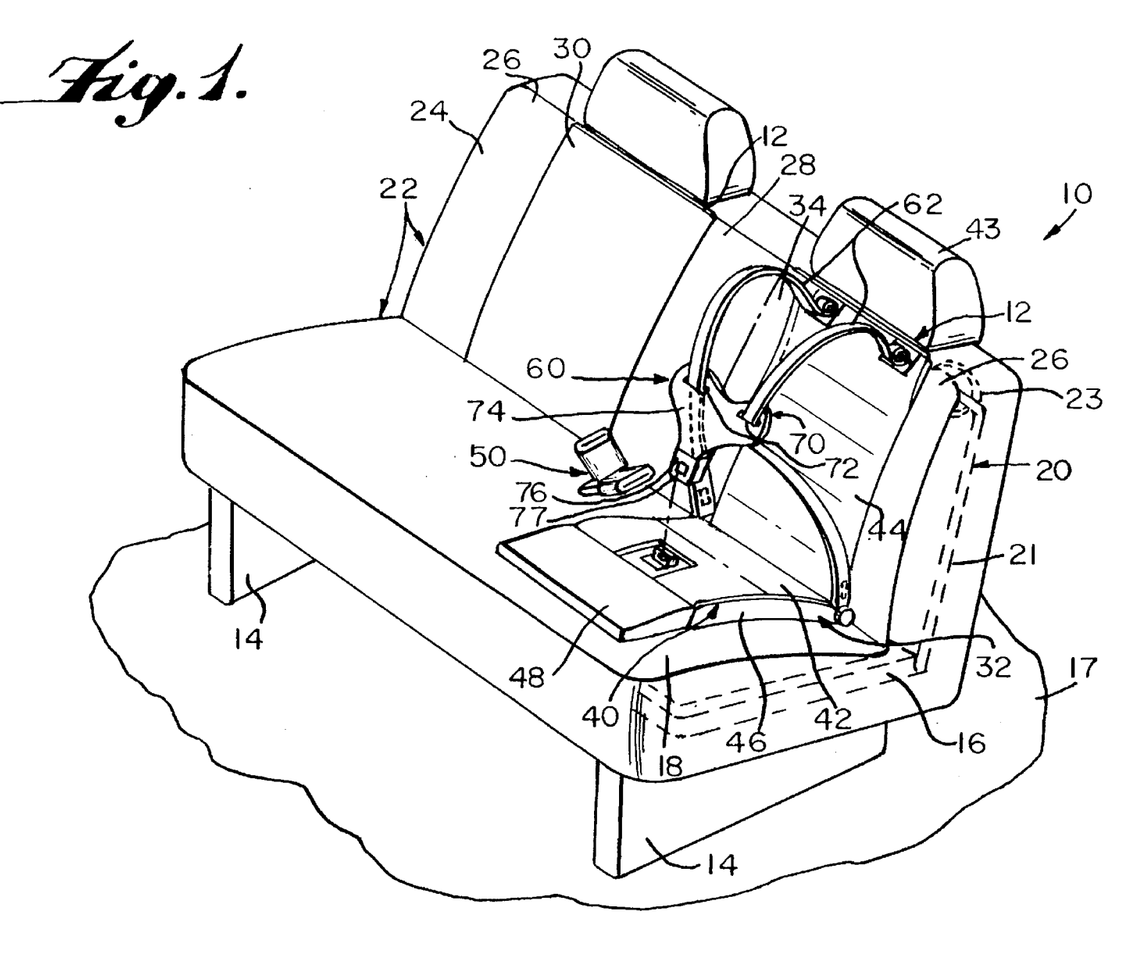
FIG. 1 a perspective view showing the seat assembly in accordance with the principles of the present invention, with the right side of the figure showing the seat assembly in the child mode position and the left side of the figure showing the seat assembly in the adult mode position.

In FIG. 1, there is shown a seat assembly 10, which includes a pair of integrated child seat assemblies, each preferably in the form of a module, generally indicated at 12, suitable to be installed into the seat assembly as a unit. The seat assembly 10 includes a pair of spaced risers 14 for mounting the seat assembly 10 on the floor 17 of a motor vehicle.

The seat assembly 10 incorporates a seat frame assembly, including a seat cushion frame assembly 16 and seat back frame assembly 20, which are shown in dashed lines in FIG. 1. The seat cushion frame assembly 16 has a tubular rectangular peripheral frame structure, and carries a covered seat cushion 18 of conventional construction. As shown, the width of the seat cushion 18 is sufficient to enable two adult seat occupants to sit thereon in side-by-side operative positions. It is understood, however, that the principles of the present invention also apply to a single seat assembly adapted to accommodate only one person, and also to seat assemblies that can accommodate more than two people.

The seat back frame assembly 20 includes a main inverted U-shaped tubular frame member 21 positioned so that the lower free ends of the leg portions thereof are rigidly fixed to the rearward sides of the main seat frame assembly 16 and so that the central bight portion extends along the upper extent of the seat back. An upper rail portion 23 extends along the central bight portion and is rigidly secured with respect thereto, preferably by welding, and facilitates securement of the child's seat belt assembly of the present invention to the seat back frame as will be more fully described in conjunction with FIG. 2. Typically, a lower tubular horizontal frame member (not shown in FIG. 1) may also form part of the seat back frame assembly 20 and would be welded or otherwise fixed between the lower leg portions of the main U-shaped frame member 21 shown.

A cushion assembly, generally indicated at 22, includes the aforementioned adult seat cushion 18 mounted on seat frame assembly 16, and a cushioned adult seat back 24. The adult seat back 24 includes the seat back frame assembly 20 on which is mounted outer and central side cushions 26, 28 and cushioning 30 disposed therebetween provided by a movable cushion assembly, generally indicated at 32. The movable cushion assembly 32 is movable between an adult mode position and a child mode position. In the adult mode position, the movable cushion assembly 32 is disposed within a space 34 between the side cushions 26 and 28 and provides the cushioning 30 vertically for engagement by the center of the back of an adult seat occupant sitting on the seat cushion 18, as shown in the left hand operative position in FIG. 1. In the child mode position, the movable cushion assembly 32 extends from the bottom of the space 34 in overlying supported relation to the seat cushion 18 so as to provide a cushioned child's seat, as shown in the right-hand operative position in FIG. 1. The cushioned child's seat includes a removable cushioned pad 40, having a seat portion 42 and a back portion 44.

A pair of manually movable headrests 43 are mounted on and extend upwardly from the cushioned adult seat back 24. In the FIGS., only the upper cushioned portion of the headrests 43 are shown. It can be appreciated, however, that the upper cushioned portions of the headrests are rigidly mounted on the central bight portion of an inverted U-shaped metallic member. The downwardly extending legs of the U-shaped member have a circular cross section and are received in slots provided in upper portions of the cushioned adult seat back 24. The legs have vertically spaced grooves or notches that cooperatively receive spring biased detentes associated with the slots in the upper portions of the adult seat back 24. The detentes ride along the legs of the U-shaped member as the height of headrest is manually adjusted and are received within the notches to enable the headrests to be selectively maintained at desired vertical positions above the cushioned adult seat back 24. It is preferred for the lower ends of the legs to be slightly flared or otherwise accommodated to prevent the headrest 43 from being completely removed from the cushioned adult seat back 24.

Each of the headrests 43 are positioned in operative relation with respect to an associated one of the movable cushion constructions 32. With the movable cushion construction 32 in the adult position, the associated headrest 43 can engage the back of the head of an adult sitting on the seat assembly 22. The vertical position of the headrests 43 can be manually adjusted to accommodate the particular size of the adult. When the movable cushion construction 32 in the child position, the associated headrest 43 is arranged to engaged the back of the head of a large child (e.g., approximately 60 pounds) sitting on movable cushion construction 32. In this instance, the headrest 43 is optimally disposed in its lowermost position. When a small child (e.g., approximately 20 pounds) is sitting on the movable cushion construction 32 in the child position, the cushioned child's seat back 44 engages the back of the head of the small child. In this instance, the position of the headrest 43 is of little consequence, since, even in its lowermost position, it is disposed out of the range of possible engagement with the back of the head of the small child.

Because the headrests 43 are adapted to accommodate both the back of the head of an adult and a large child, they are disposed at a position, fore and aft, which is a compromise between the ideal position for accommodating the head of an adult sitting on the adult seat cushion when the associated movable cushion construction is in the adult position, and the ideal position for accommodating the head of a large child sitting on the associated movable cushion construction when the associated movable cushion construction is in the child position.

The movable cushion assembly 32 preferably includes a main bolster portion 46 and a detachable peripheral second bolster portion 48, as shown. With the movable cushion assembly 32 in the adult mode position, the forwardly facing surfaces of the main and second bolster portions 46 and 48 provide the cushioning 30. The bolster portions 46 and 48 fill the entire space 34 between the side cushions 26 and 28 and extend substantially along the entire extent of the adult seat back 24. It is preferred that the seat portion 42 of the cushioned pad 40 cover only the main bolster portion 46 of the movable cushion assembly 32 to enable the peripheral bolster portion 48 to be detached without any excess of the padded seat portion 42 extending onto the adult seat cushion 18. Preferably, the connection between the two bolster portions 46 and 48 is in the form of a zipper arrangement. A more detailed disclosure of the detachable connection between main bolster portion 46 and peripheral second bolster portion 48 of the movable cushion assembly 32 is disclosed in U.S. patent application Ser. No. 08/287,278 filed Aug. 8, 1994, as a continuation of Ser. No. 07/882,610 filed May 13, 1992, to Czapski, and hereby incorporated by reference. A fuller appreciation for the type of construction contemplated for main bolster portion 46 can also be gathered from the aforementioned patent application.

The seat assembly 10 also includes an adult seat belt assembly, the buckle portion of which is generally indicated at 50. The adult seat belt assembly can be of any type, and is provided to restrain an adult sitting on the seat assembly in the adult position. The child's seat belt assembly of the present invention, generally indicated at 60, is connected with the seat frame assembly (e.g., with seat back frame assembly 20). The child's seat belt assembly 60 includes a pair of shoulder belts 62, each extending from respective take-up reels 64 (see FIG. 3) connected with the upper bight portion of seat back frame assembly 20. The shoulder belts 62 extend forwardly of the cushioned child's seat back 44 for extension over the shoulders of a child sitting on the cushioned child's seat 42 with the movable cushion assembly 32 in the child mode position. A connector structure 70 is provided to latch the shoulder belts 62 in restraining relation with respect to a child's seat occupant. The connector structure 70 includes a main shield portion 74, preferably made from a rigid moldable plastic material, that slidingly receives the shoulder belts 62 through slots 72 provided therein. The connector structure also includes a latch or buckle mechanism 76 provided at a lower portion thereof for releasable connection with a connecting member in the form of a metal connecting tongue or clip 78 provided with the main bolster portion 46 of the cushioned child's seat. The connecting clip 78 provides an anchor point which enables the child's seat belt assembly 60 to be releasably locked between the legs of a child sitting on the cushioned child's seat. The latch mechanism 76 can be released from the connecting clip 78 by depressing an unlocking button 77 provided on the latch mechanism 76.

Figure 2:
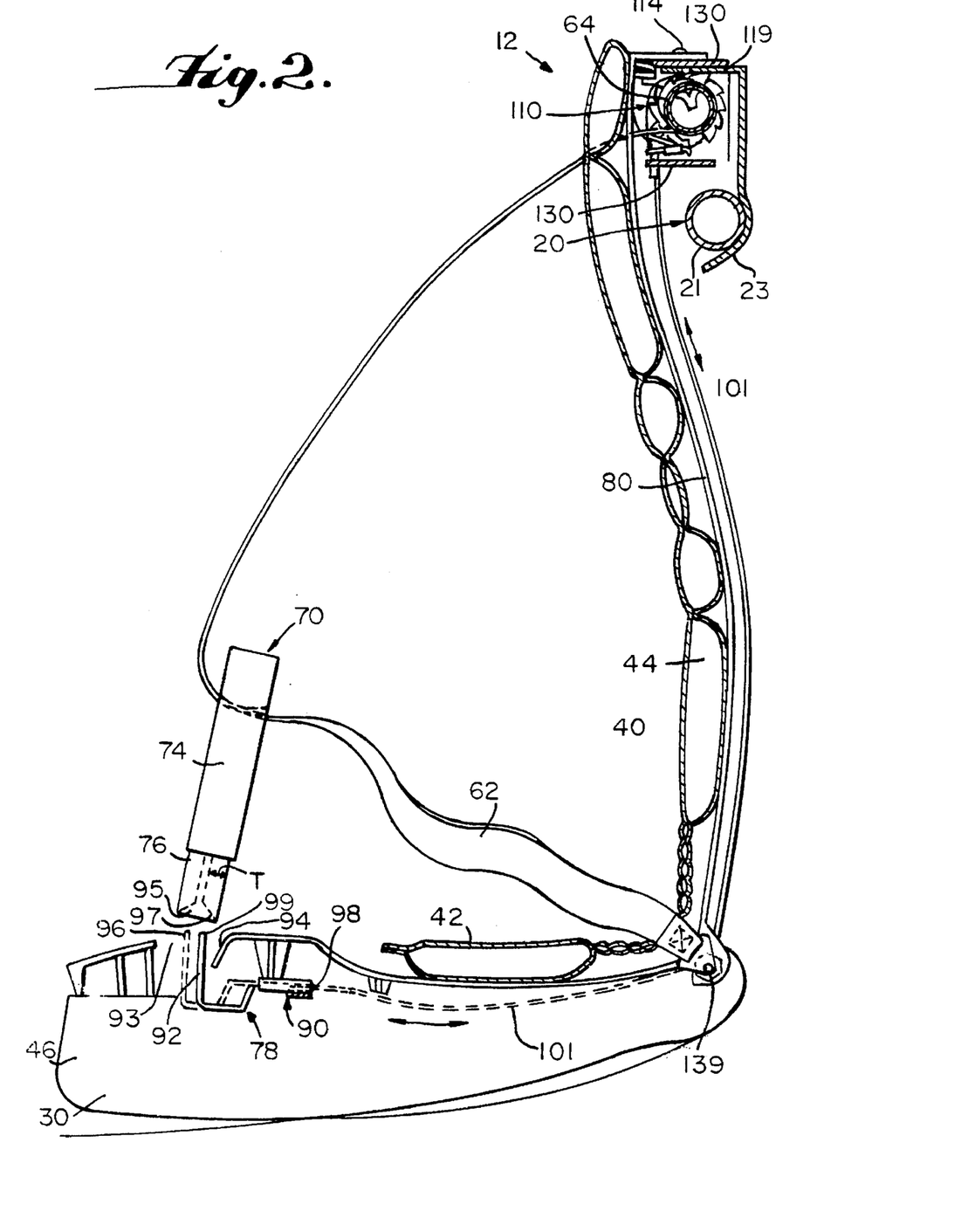
FIG. 2 is a schematic side view, with certain elements omitted to better reveal others, showing the child's seat module mounted to a vehicle seat back frame.

FIG. 2 is a side view schematically showing the child seat module 12 of the present invention. As shown, the peripheral bolster portion 48 of the movable cushion assembly 32 has been removed. It can also be appreciated that the child seat module 12, which is to be mounted on the seat back frame assembly 20 between the side cushions 26 and 28, includes a rigid structure, which in the broader aspects of the present invention, may be regarded as part of the seat back frame assembly 20. The rigid structure is in the form of a back panel 80 of rigid material, as, for example, a suitable moldable plastic material. This same moldable material can be used for a horizontal support member 82, which is disposed in overlying horizontal relation on the cushioning 30 when the movable cushion assembly 32 is in the child mode position. Preferably, the removable cushioned pad 40 is adhered to the back panel 80 and support member 82 by use of VELCRO fastener material in the manner described in the aforesaid '728 and '810 applications.

The metal connecting clip 78 is spring biased by a spring assembly 90 into a rearward inoperative position, as indicated by the solid line position of clip 78 in FIG. 2. The connecting clip 78 has a vertically extending portion 92 extending upwardly through an opening 93 in the rigid support 82, adjacent a downwardly sloping edge 94 of the support 82.

To lock the child's seat belt assembly 60, an individual grasps the shield portion 74 or latch mechanism 76 of connector structure 70 and latches the latch mechanism 76 onto clip 78 by forcing the latch mechanism 76 onto the vertical portion 92 of the clip 78. Latch mechanism 76 is provided with a slot 95 for receiving clip 78 in conventional fashion. It can be appreciated that when clip 78 is in its biased inoperative rearward position, the distance between the vertical portion 92 of clip 78 and the sloping edge 94 of the rigid support surface 82 is less than the thickness "T" between the aforementioned receiving slot 95 and the outer housing of latching mechanism 76 as can be appreciated from FIG. 2. Thus, movement of the latching mechanism 76 into latching engagement with clip 78 causes a leading sloping surface 97 of latching mechanism 76 to contact the upper edge 99 of clip 78. Continued downward forced movement of the mechanism 76 onto the clip 78 causes the thickness "T" thereof to be wedged between the vertical portion 92 of clip 78 and sloping edge 94 until the clip 78 moves forwardly into the dashed-line operative position, generally indicated at 96, against the bias of spring assembly 90.

The rearward portion of clip 78 is connected with one end of a cable member 100. The cable member 100 extends rearwardly from the clip 78 through a flexible sheath or tube 101, one end of which is fixed beneath rigid support 82. The cable member 100 and surrounding flexible tube 101, which constitutes a Bowden wire assembly, extend upwardly behind the back panel 80 for connection with a controlling mechanism, generally indicated at 110, in a manner hereinafter to be more fully described. When the latch mechanism 76 is latched onto clip 78 so that clip 78 is moved to the operative position, the cable member 100 causes controlling mechanism 110 to lock reels 64 (see, FIG. 3) against paying-out belts 62. In this fashion, when a child occupies the child's seat in the child mode position, and the locking mechanism 76 is latched onto clip 78, the belts 62 will not permit the child to move forwardly to any significant extent.

Figure 3:
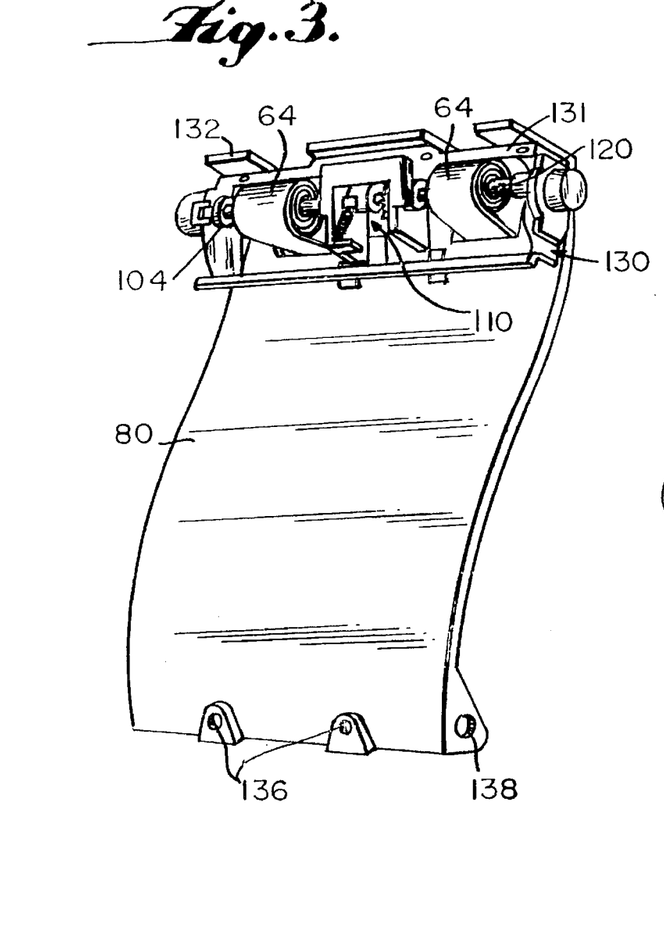
FIG. 3 is a schematic perspective view showing the back panel and a portion of the child's seat belt assembly in accordance with the principles of the present invention.
Figure 4:
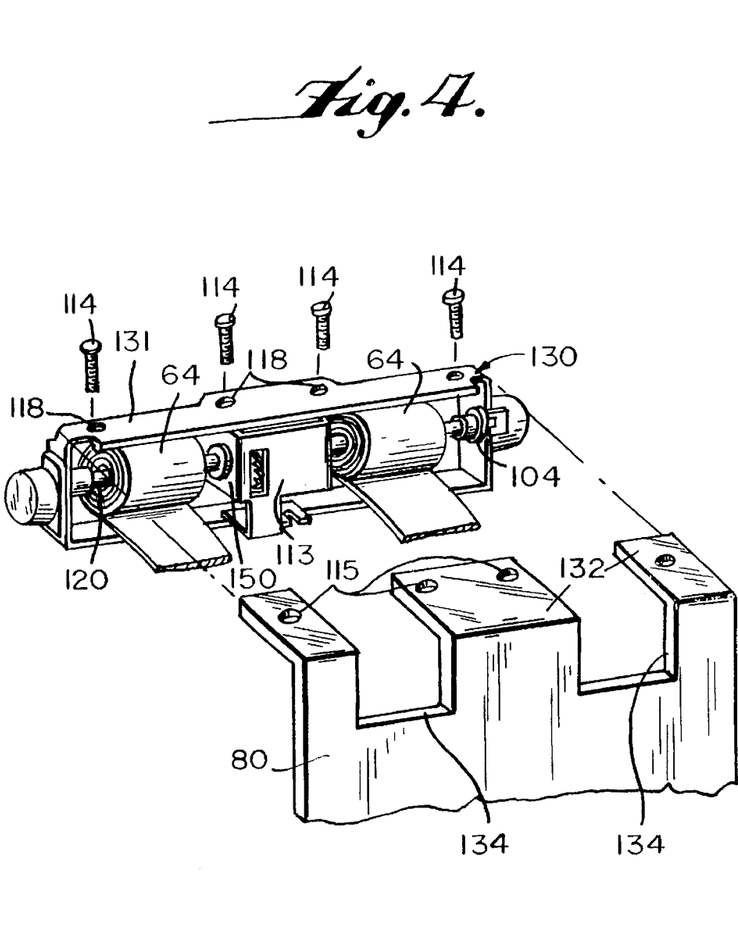
FIG. 4 is a schematic perspective view showing the connection of the controlling mechanism and take-up reels of the child's seat belt assembly with the back panel in accordance with the principles of the present invention.

FIGS. 3 and 4 are schematic views showing certain portions of a child seat module 12 of the present invention. More specifically, the back panel 80 is shown, together with reels 64 and controlling mechanism 110 carried by a metallic mounting frame assembly 130. In FIG. 4, it can be appreciated that the controlling mechanism 110 is protected by a forward shield housing 113, which may be formed as part of the frame assembly 130. The back panel 80 is secured to mounting frame assembly 130 via fasteners 114. More specifically, mounting frame 130 is positioned so that an upper frame portion 131 thereof is disposed beneath a rearwardly extending flange portion 132 of the back panel 80, and appropriate fasteners 114 are extended through openings 115 through the flange portion 132 and then through aligned openings 118 in the upper frame portion 131 to make the securement. Referring back to FIG. 2, it can be appreciated that fasteners 114 are also used to secure back panel 80 and mounting frame assembly 130 to the seat back frame 20. More specifically, upper rail portion 23 has a forwardly extending flange portion 119 having openings therethrough (not shown) that are aligned with openings 115 and 118 and which receive lower portions of the fasteners 114 therethrough. Preferably, the upper frame portion 131 of mounting assembly 130 is slid up on top of the forwardly extending flange portion 119 so that the seat back frame assembly 20 supports both the mounting assembly 130 and back panel 80 without reliance solely on the fasteners 114. It can be appreciated, however, that the upper frame portion 131 and flange 132 can be mounted and secured beneath the flange portion 119 if desired. In any event, the take-up reels 64 are rigidly connected with an upper portion of the back panel 80 and the seat back frame assembly 20.

Figure 10:
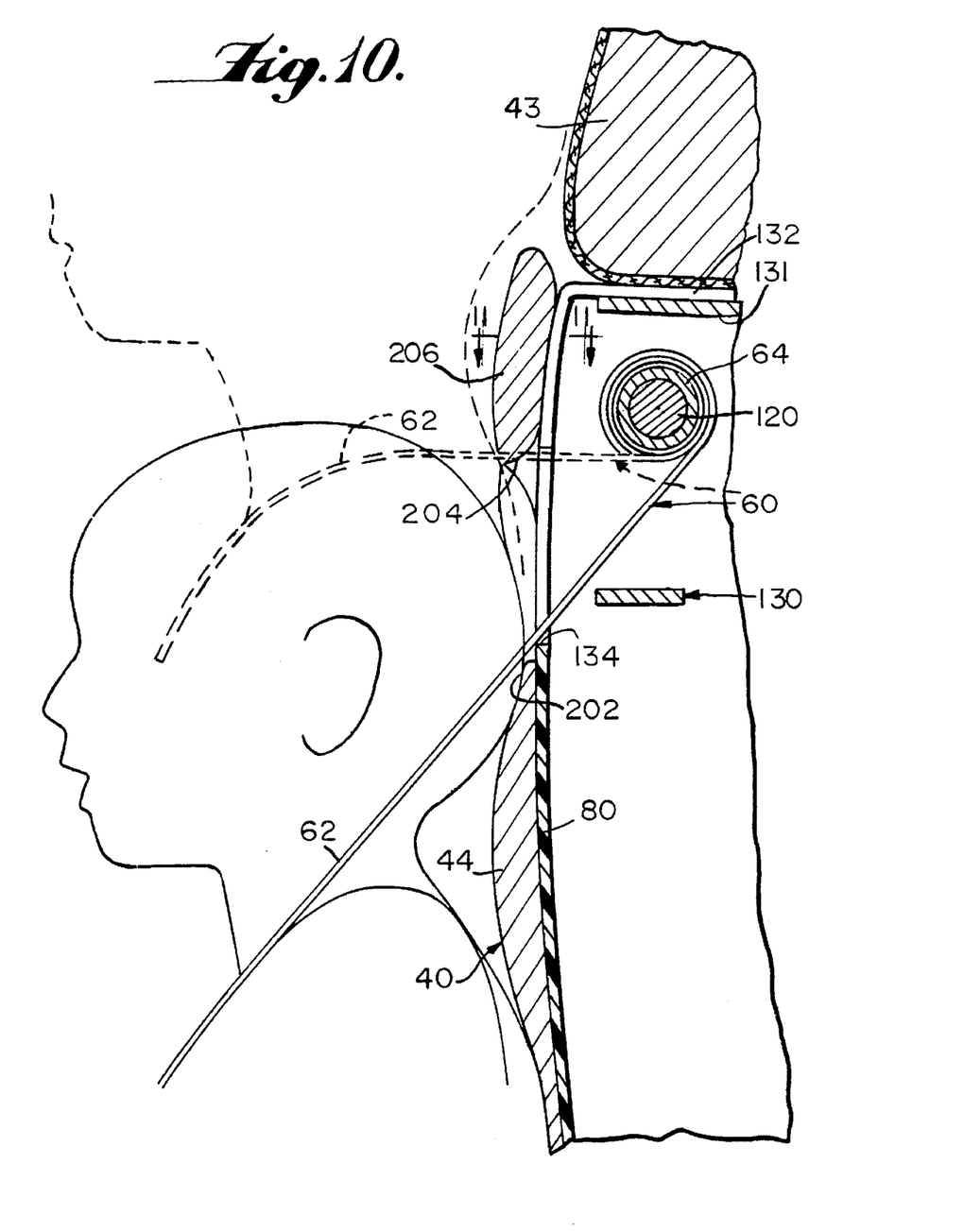
FIG. 10 is an enlarged fragmentary vertical sectional view illustrating somewhat schematically the automatic accommodation provided by the present invention of a small child in solid lines and a large child in dotted lines.

Referring to FIGS. 3, 4 and 10 it can be appreciated that reels 64 are each wound on a common spindle or spool assembly 120, which serves as a belt supporting structure, and which extends through side openings 104 in frame assembly 130 so as to be rotatably carried by the mounting frame 130 and operatively connected with the controlling mechanism 110. It can also be appreciated that the belt supporting structure or spool 120 supports an upper portion of the belt portions which extend to the child's shoulders. Spool 120 is rotatable in opposite directions about its own axis to effectuate pay-out and take-up of belts 62 to and from reels 64. The controlling mechanism 110 is constructed to selectively permit and prevent rotation of spool 120 to control pay-out and take-up of the belts 62 by the reels 64. Unlike a conventional belt retraction assembly in which one controlling mechanism is used for each reel and in which each reel is rotatable about its own spool, the present invention enables a single controlling mechanism to be used to control two reels, as the two reels share the same spool. As a result, each belt is taken-up and paid-out simultaneously with and to the same extent as the other so that substantially the same length of each belt will extend from the respective reels at all times. This prevents uneven distribution of the belts, and reduces the cost and size of the components required in the assembly. The reduced size enables the reels and controlling mechanism to be easily mounted on the upper portion of the seat back frame.

In FIGS. 3 and 4 it can be seen that each reel 64 consists of belt material wound upon itself about spool assembly 120.

While the reels may be encased in housings having slots through which the belts 62 may extend, it is preferred that such housings be omitted. It has been found that contact between the belts and the edges defining the aforementioned slots may impose unwanted friction on the belts and interfere with pay-out and take-up of the belts.

The upper portion and rearwardly extending flange portion 132 of back panel 80 are provided with spaced openings 134, which permit the belts 62 to extend forwardly of the back panel 80 therethrough. The bottom portion of the back panel 80 is provided with holes 136 for securement to the lower portions of the seat back frame 20. In addition, spaced openings 138 are formed at opposite lower sides of back panel 80 for receiving appropriate fasteners 139. The fasteners 139 are used to mount the back panel on the opposite rearward sides of the movable cushion construction 32 and to connect the lower ends of the belt 62 with said opposite rearward sides as shown in FIG. 2. It can be appreciated that fasteners 139 serve as an anchor for the lower ends of belts 62 and also as a pivot point for the movable cushion construction 32.

Figure 5:
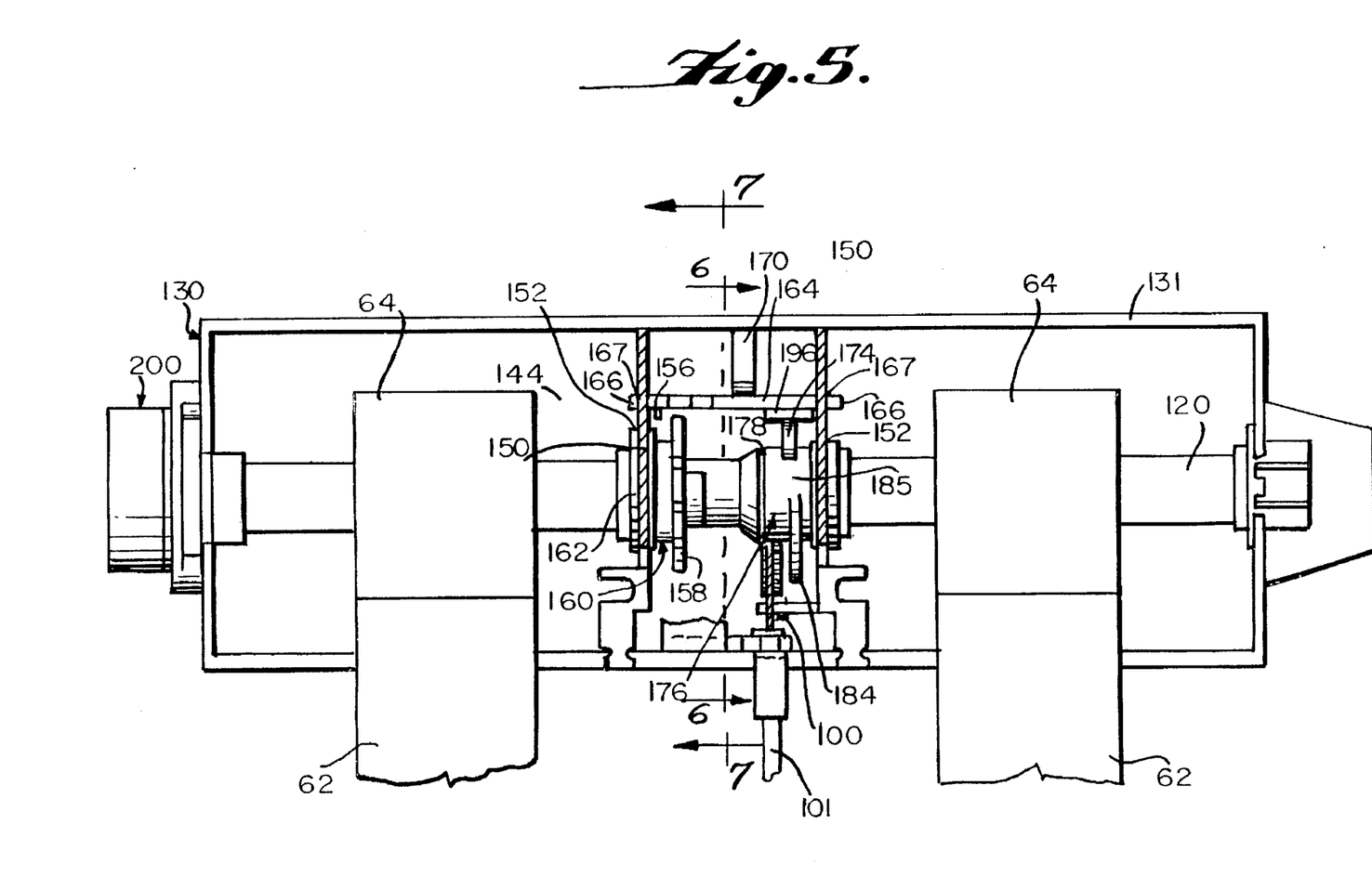
FIG. 5 is a front plan view, with certain parts removed to better reveal others, of the take-up reels and controlling mechanism in accordance with the principles of the present invention.

FIG. 5 is a plan view, partly in section, of a portion of the child's seat belt assembly of the present invention. In FIG. 5, certain elements (such as the front plate of shield housing 113) are omitted to better reveal others. The shield housing 113 has opposite side walls 150 having openings 152 therethrough for receiving spool assembly 120. Disposed about the spool assembly 120 within the shield housing 113 is a ratchet assembly 156, which includes a metallic ratchet member 158 rigidly mounted on a plastic bearing member 160. The bearing member 160 rotates with spool assembly 120 and has a peripheral annular groove provided in a portion 162 thereof. The peripheral groove provided within portion 162 is adapted to receive the inner edges defining one of the openings 152 in the side walls 150 of the shield housing 113. Preferably, bearing 160 is formed from a plastic material.

As also shown in FIG. 5, the controlling mechanism further includes a pawl member 164, which is in the form of a metallic plate having opposite pin portions 166 extending from opposite sides thereof through respective openings 167 in the opposite parallel sides 150 of the shield housing 113. The pin portions 166 extend through the respective openings in such fashion as to permit the pawl member 164 to pivot about an axis generally defined by the pin portions 166. The controlling mechanism further includes a leaf spring 170 for biasing the pawl member 164 in a pivotal direction towards the ratchet member 158. In FIG. 5, however, the pawl is kept out of engagement with ratchet member 158 via the engagement of pawl member 164 with a lever arm 174 mounted on a rotatable plastic wheel 176. The metal pawl member 164 has a plastic engagement member 196 fixed thereto and provided to contact the arm 174. The wheel 176 is rotatably mounted on a bearing 178, which is fixed to the spool assembly 120. This arrangement enables the wheel 176 to be rotatable independently of the spool 120. This is unlike the arrangement of ratchet member 158 and bearing 160, wherein ratchet 158 is fixedly mounted with respect to bearing 160 and bearing 160 is fixedly mounted with respect to spool assembly 120 so that rotation of ratchet 158 can occur only with rotation of the spool assembly 120. Spool assembly 120 is normally biased in a rotational direction that will cause reels to take-up slack in belts 62 from a generally bottom portion of reels 64. Such biasing of the spool assembly is accomplished with a conventional spring assembly, generally indicated at 200, which is connected at one side of the mounting frame assembly 130.

Figure 6:
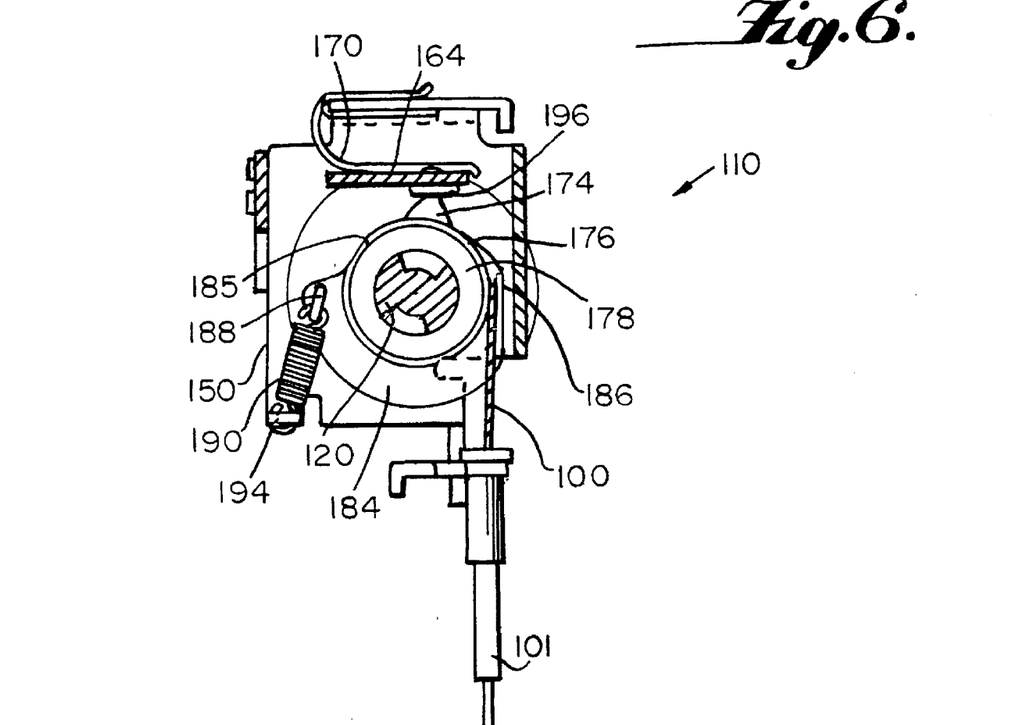
FIG. 6 is a side sectional view taken along the line 6—6 in FIG. 5, showing the controlling mechanism in an unlocked condition in accordance with the principles of the present invention.
Figure 7:
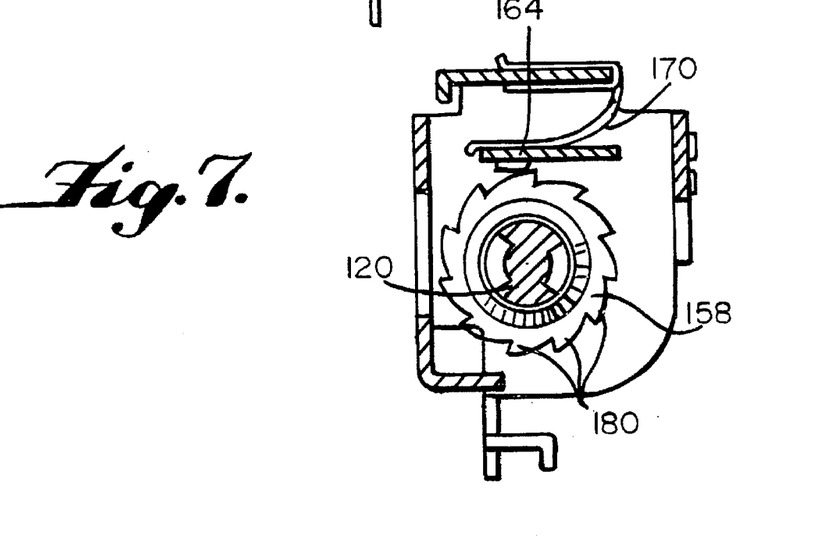
FIG. 7 is a side sectional view taken along the line 7—7 in FIG. 5, showing the controlling mechanism in an unlocked condition in accordance with the principles of the present invention.

FIG. 6 is a view taken through the line 6—6 in FIG. 5, and shows the pawl member 164 retained in its unlocked position relative to ratchet member 158 against the biasing force of leaf spring 170 by the stopping action of lever arm 174. This can be more fully appreciated from FIG. 7, which is a sectional view taken through the line 7—7 in FIG. 5. FIG. 7 shows the pawl member 164 out of engagement with teeth 180 provided along the outer periphery of ratchet member 158.

Referring back to FIGS. 5 and 6, it can be appreciated that lever arm 174 extends radially outwardly from an annular core portion 185 of wheel 176. It can also be seen that wheel 176 further has a plate-like radially extending flange portion 184 that partially surrounds the core portion 185, and a spring receiving portion 188 formed on the flange portion 184. The wheel also has a hook portion 186 radially extending from the core portion 185. Preferably, the wheel 176 is integrally formed from a molded plastic material.

Figure 8:
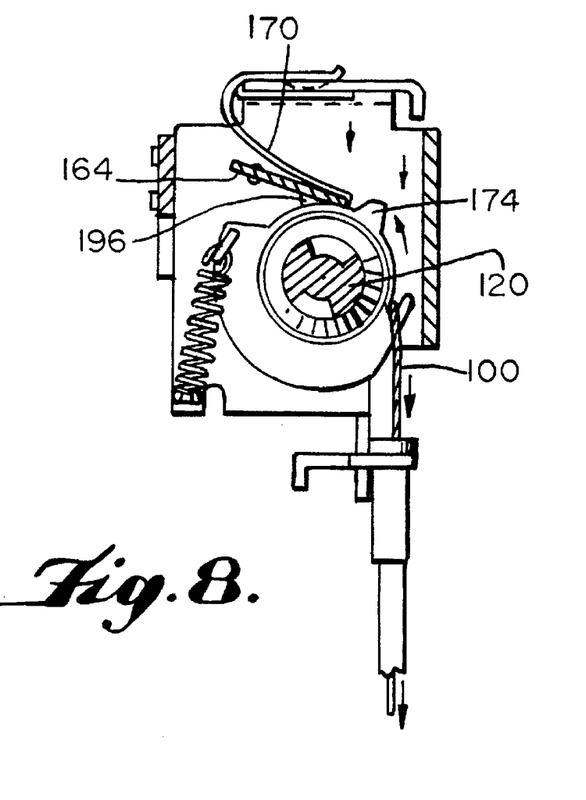
FIG. 8 is a side sectional view similar to FIG. 6, but showing the controlling mechanism in a locked condition in accordance with the principles of the present invention.
Figure 9:
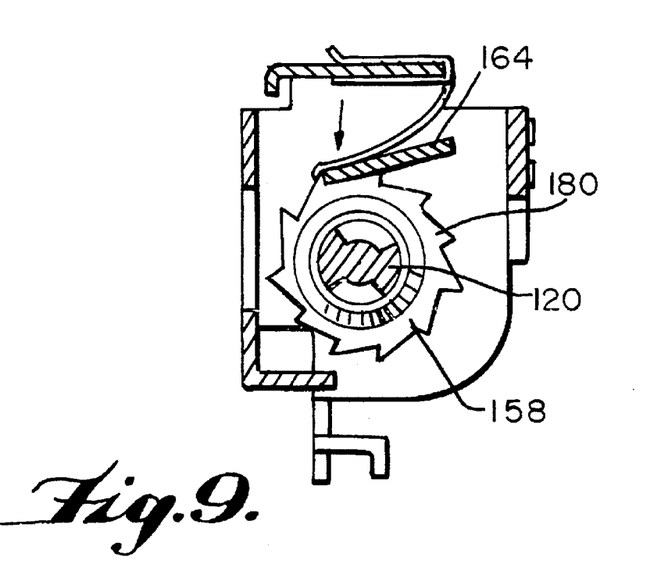
FIG. 9 is a side sectional view similar to FIG. 7, but showing the controlling mechanism in a locked condition in accordance with the principles of the present invention.

FIG. 6 shows the lever arm 174 in its furthest counter-clockwise position, as limited by action of the cable 100 and the rearwardmost position that can be assumed by connector 78 in its inoperative position. FIG. 6 also shows the connection of the Bowden wire assembly to the controlling mechanism 110. As shown, the adjacent end of the flexible tube 101 is fixed to the frame assembly 130. The adjacent end of the cable member 100 is looped around and fixed to the hook portion 186. When connector 78 is moved to its operative position 96, cable 100 will be tensioned to cause clockwise movement of wheel 176 in FIG. 6 against the force of a coil spring 190 connected between the spring receiving portion 188 and a connecting portion 194 of shield housing 113. This can be clearly seen in FIG. 8. As can also be appreciated from FIG. 8, movement of the wheel in such fashion causes lever arm 174 to come out of engagement with the plastic engagement member 196 of pawl member 164 to permit pivotal movement of pawl member 164 about pin members 166. The biasing force of leaf spring 170 forces such pivotal movement of pawl 164 until it engages one of the ratchet teeth 180, as shown in FIG. 9. Once pawl member 164 engages one of the teeth 180, spool 120 cannot be rotated in the clockwise direction in FIG. 9, and the reels 64 are thus prevented from paying-out belts 62.

In FIG. 9, the bias of spool 120 via spring assembly 200 (e.g., see, FIG. 5) may move the ratchet member 158 in a counter clockwise direction when an excess amount of slack remains in the belts 62, even after the child's seat belt assembly is locked between the legs of a child seat occupant. The pawl member 164 will then engage the next tooth within teeth 180 to retain the belts 162 slightly tensioned over the shoulders of the child seat occupant at all times. It can be appreciated that the degree of tensioning can be controlled to some extent by the spacing between teeth 180 and by the degree of biasing force provided by spring assembly 200.

OPERATION OF THE AUTOMATIC CHILD SIZE ACCOMMODATION

Referring now more particularly to FIG. 10, this figure illustrates how the child's seat belt assembly 60 is restrained to automatically accommodate a small child, as, for example, a 20-pound child, the head and shoulders of which is shown in outline in solid lines in FIG. 10 as well as a large child, as, for example, a 60-pound child, the head and shoulders of which is shown in outline in dotted lines in FIG. 10. As shown in FIG. 10, each of the shoulder belts 62 when the child seat belt assembly 60 is in a restraint condition includes a generally straight portion which extends forwardly from a position rearwardly of a support surface, which is indicated at 202 in FIG. 10, as being the surface provided by the removable cushion pad 40 when compressed by engagement of a child therewith. It will be noted that each one of the pair of horizontally spaced and horizontally aligned openings 134 formed in the upper end of the back panel 80 receives the straight portions downwardly.

Figure 11:
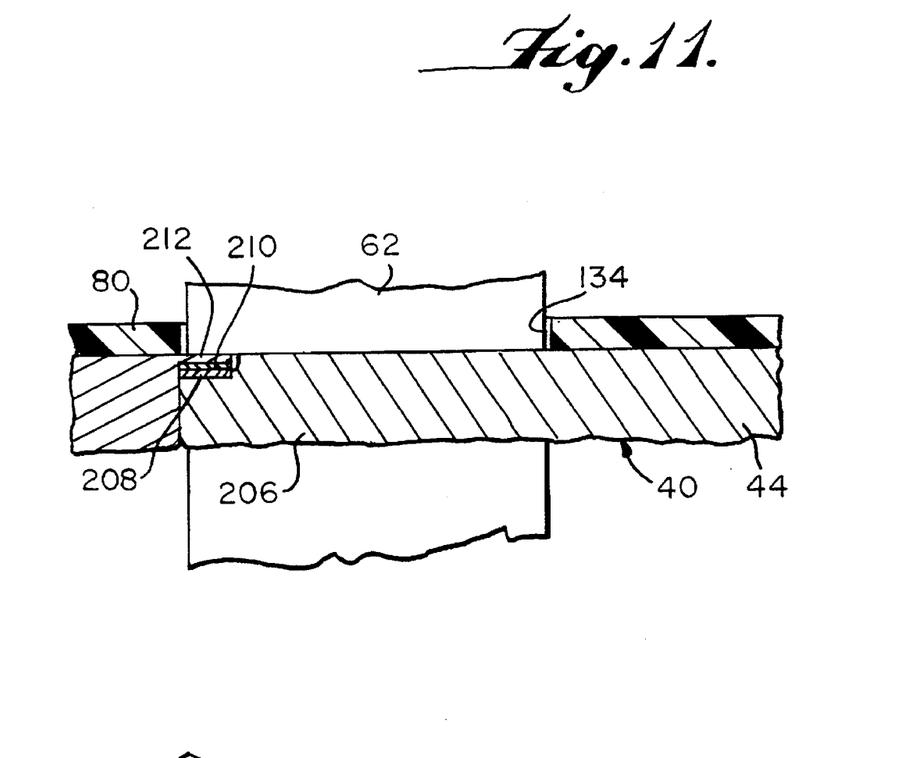
FIG. 11 is an enlarged fragmentary sectional view taken along the line 11—11 of FIG. 10.

In a similar fashion, the upper end of the removable cushioned pad 44 is provided with a pair of horizontally spaced and horizontally aligned openings, indicated at 204, which likewise receive the straight portions of the shoulder belts 62. As shown in FIGS. 10 and 11, the upper end portion of the removable cushioned pad 44 includes a pair of flap portions 206 which include free ends and which extend in front of an upper portion of the openings 134 in the back panel 80. As best shown in FIG. 11, the free end of each flap portion 206 is formed with a strip of hooks 208 and a cooperating strip of loops 210 is mounted on a thin section 212 extending from the adjacent portion of the removable cushioned pad 40.

In this way, the shoulder belts 62, during assembly, can be extended through the openings 134 and 204 by simply lowering the same through the openings 134 in the back panel 80 and into openings 204 after disengaging the free ends of the flap portions 206. After the belts 62 have been entered in the openings 134 and 204, the flap portions 206 are secured in place by interengaging the hook and loop strips 208 and 210. The flap construction is particularly desirable in the removable cushioned pad 40 since it clearly facilitates removal.

As shown in FIG. 10, the child's seat belt assembly 60 is constructed and arranged to automatically accommodate any particular child within a nominal size range between a 20-pound child and a 60-pound child without the straight portions 62 thereof having any appreciable forwardly and upwardly extent even for a 60-pound child or any appreciable ear interference even for a 20-pound child. This relationship is clearly evident from the illustrations contained in FIG. 10. The automatic accommodation is accomplished by restricting the straight portions to extend forwardly from the support surface 202 automatically from progressively lower levels and progressively greater angles to the horizontal as the particular child held in the restraint condition of the child seat belt assembly 60 is of progressively diminishing size within a range of between a 20-pound child and a 60-pound child. More specifically, each of the straight shoulder belt portions 62 is restrained to extend rearwardly to one of a pair of horizontally spaced and horizontally aligned positions of restraint provided by the seat back frame assembly 20 rearwardly of the support surface 202.

As shown in FIG. 10, the reels 64 provide the positions of restraint and the support therefor is provided through the seat back support assembly 20 through the frame assembly 130 of the reel mechanism. This preferred arrangement makes it possible to make the back panel 80 of a lighter construction and of less expensive material than is the case where the back panel must resist the load.

The size accommodation principles of the present invention are not limited to the child's seat belt assembly 60 which has thus far been described and which is more specifically disclosed and claimed in U.S. patent application Ser. No. 08/387,427, filed Feb. 10, 1995 in the name of Dukatz et al. This application U.S. patent application Ser. No. 08/387,426, filed Feb. 10, 1995 in the name of Dukatz et al. which has the same title and the same inventors but discloses an earlier version of the subject matter.

The present invention does not rely upon the details that are disclosed and claimed in the aforesaid concurrently filed applications. The child's seat belt assembly 60 is illustrative of one embodiment of a five point system in which restraint and release is under the control of a shield portion 74 with a latch mechanism 76 which locks into a clip 78 built into the child's seat and the adjustment as to size is achieved by reels 64 for the shoulder belts 62 positioned at the upper child's seat back which are normally capable of being reeled in under spring pressure and manually paid out but which are locked against pay out when the shield portion 74 is engaged with the cooperating clip 78 in the child's seat. The principles of the present invention are applicable to three point systems and four point systems as well as five point systems, which are greatly preferred. The principles of the present invention are applicable to reel systems where the reel or reels are positioned either down the child's seat back or into the child's seat where the belt portions being reeled in are the shoulder belts, the lap belts or the crotch belt. Moreover, the manner in which the reels are controlled can be in accordance with any known arrangement, as, for example, normally movable under spring bias and restrained against pay out only when a predetermined event is sensed. The principles of the present invention are applicable to systems in which release and lock up are provided in any known manner in addition to the arrangement shown. Moreover, the system need not be a reel take-up system but may be any known manual take-up system, as, for example, the system shown in the '756 patent previously discussed.

In the embodiment shown in FIG. 10, it will be understood that the straight portions 62 are formed when the entire child's seat belt assembly 60 is disposed in its restraint condition with respect to the child sitting in the child's seat. In this embodiment, the straight portions 62 extend forwardly in tangential relation beneath the reels 64. When a 20-pound child is accommodated, the straight shoulder belt portions 62 extend from the restraint positions which are tangential to the reel forwardly and downwardly past the support surface 202 and then straight down to a point near the shoulders of the small child. The restraint position is disposed approximately 1.5 inches (horizontal distance) rearwardly from the support surface 202. The shoulder height distance between a 20-child and a 60-pound child is approximately 7 inches. The position of restraint is chosen so that, in extending straight to the shoulders of a large child, the straight portions are generally horizontal as shown. The range of movement of the straight portions at the support surface is approximately 2". When extended to the shoulders of a small child, the straight portions are at an angle which is approximately 50°. The generally horizontal extent of the straight portions of the shoulder belts for accommodating the 60-pound child prevents the belt from moving significantly downwardly if tensioned in an emergency. Thus, one desirable feature is, as aforesaid, that, in accommodating the, the largest child suited for the child's seat straight portions 62 should extend generally horizontally, with no significant or appreciable upwardly and forwardly extent. The angular extent which the straight portions 62 extend downwardly when accommodating the small child keep the straight portions from interfering with the ears of the small child. If the seat belts were allowed to come directly downwardly from the same level with respect to the surface 202 to accommodate the smaller child, ear interference would exist. By moving the positions of the restraint rearwardly of the support surface 202, automatic size accommodation is achieved so long as a straight line to the restraint position is maintained. As previously indicated, it is not essential in the principles of the present invention to have the restraint positions determined by reels 64.

Figure 12:
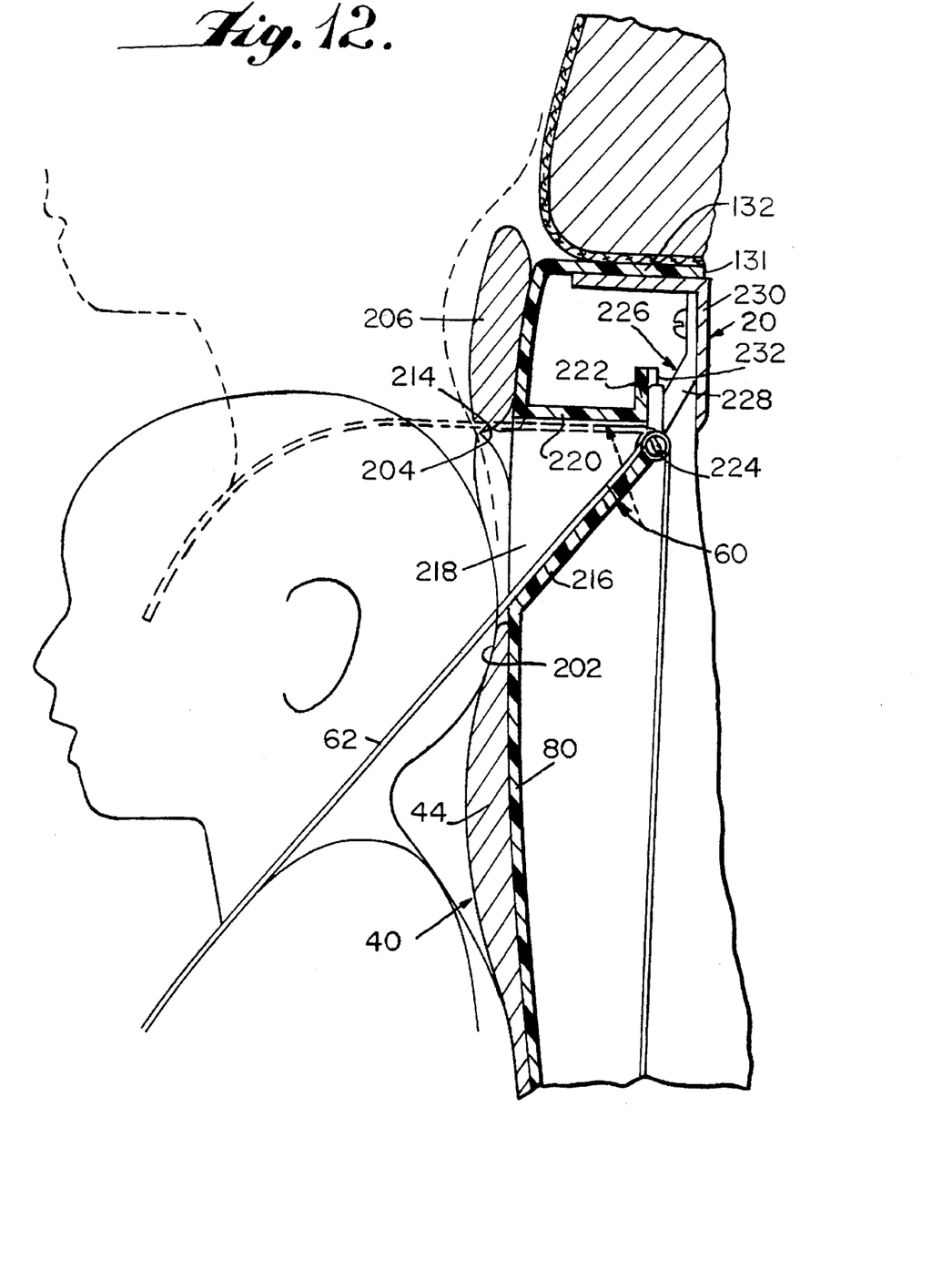
FIG. 12 is a view similar to FIG. 10 showing a modified embodiment of the present invention.

FIG. 12 illustrates another embodiment where, instead of the child's seat belt assembly including reels 64 which are mounted at the upper end of the seat back, the child's seat belt assembly 60 is of the type where the shoulder belts extend over the positions of restraint and downwardly either to be combined into one belt and extended forwardly through a one-way lock to the front of the child seat to permit manual adjustment or to reels mounted further down the seat back. As shown in FIG. 12, the back panel 80 is provided with a pair of horizontally spaced and horizontally aligned rectangular openings 214 which are spaced from the top edge thereof in lieu of the openings 134 previously described. In addition, a bottom wall portion 216 extends integrally from the lower edge of each opening 214 upwardly and rearwardly, two side wall portions 218 extend integrally rearwardly from the sides of each opening 214, and a top wall portion 220 extends from the top of each opening 214 and from the back panel 80 therebetween rearwardly and includes an upwardly extending flange portion 222. The rearward edge of each lower wall portion 216 is spaced from the rearward edge of the upper wall portion 220 to permit the passage of a shoulder belt therethrough.

Figure 13:
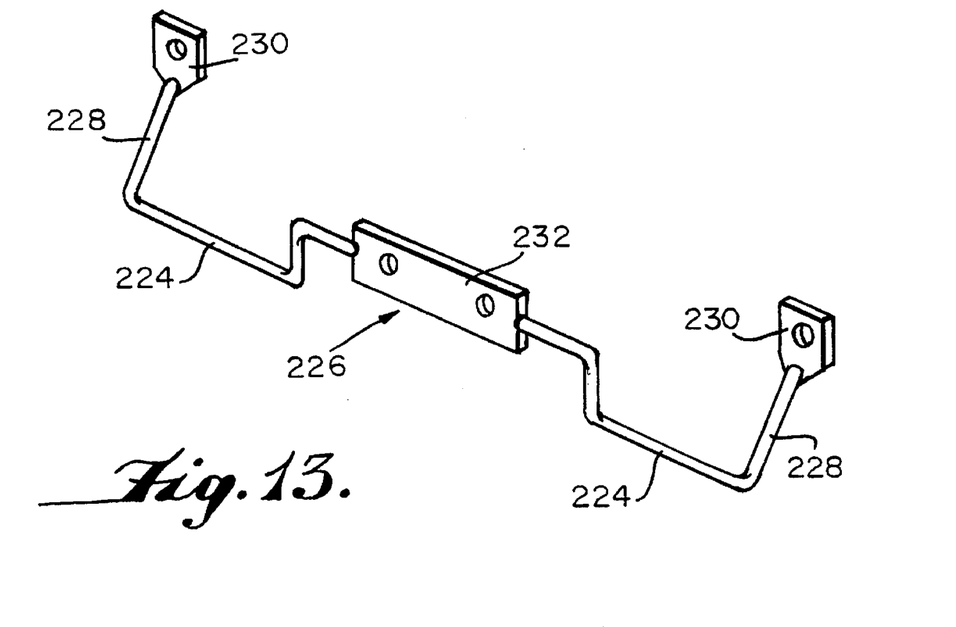
FIG. 13 is a perspective view of the mounting bracket shown in FIG. 12.

The modified child's seat belt assembly 60 in its restraint condition provides the same straight shoulder belt portions 62 previously mentioned which extend from the positions of restraint. The positions of restraint are provided by a belt supporting structure in the form of two spaced bale portions 224 formed on a bracket, generally indicated at 226. The belt supporting structure or bale portions 224 are disposed rearwardly of the support surface 202 and support an upper portion of the belts. As best shown in FIG. 13, the bracket 226 includes two end legs 228 which terminate in flat portions 230 suitably apertured to receive fasteners. The bale portions 224 extend from the opposite ends of the legs 228 inwardly toward one another with the opposite ends thereof interconnected by an inverted U-shaped section, the center portion of which is flattened as indicated at 232 and provided with fastener receiving openings. The flattened end portions 230 are engaged to the rigid frame of the seat back support assembly 20 and the central portion 232 is fixed by a fastener to the flange 222 provided on the upper wall portion 220. The shoulder belts 62 extend around the bale portions 224 and downwardly as aforesaid either to reels which are provided on the back or seat or they are combined as aforesaid to form one belt which extends forwardly to the front of the seat through a one-way lock which can be moved to effect manual adjustment.

Figure 14:
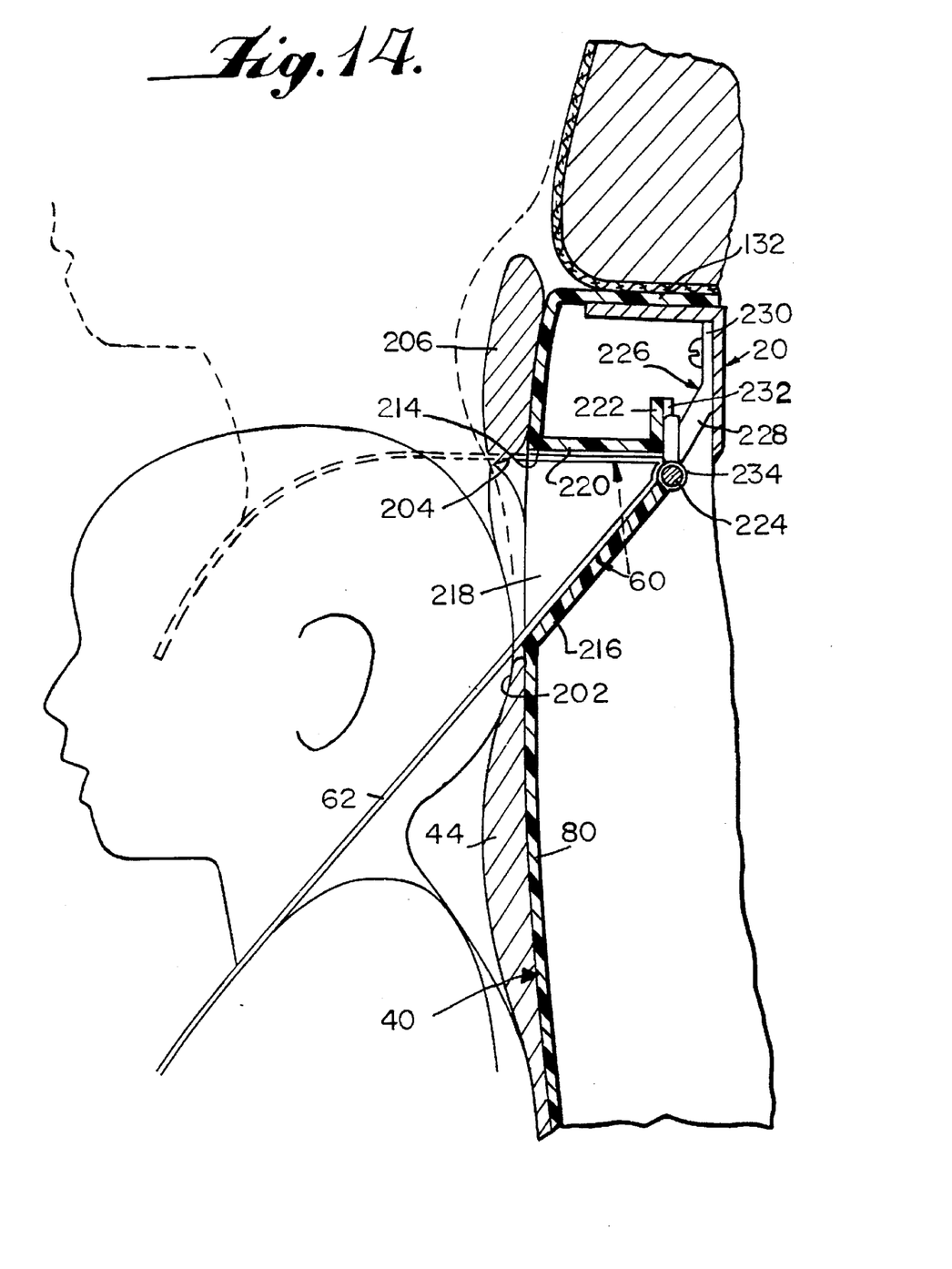
FIG. 14 is another view similar to FIG. 10 showing another modified embodiment of the present invention.

FIG. 14 illustrates another embodiment of the invention wherein the walled construction of the back panel 80, as shown in FIG. 12, is again used with bracket 226. In this embodiment, the shoulder belts 62 extend to the bail portions 224 as positions of restraint but have their ends fixed thereto, as indicated at 234. With this embodiment, adjustment must be provided on either the crotch belt or the lap belt portions.

Any United States patent applications or patents mentioned or cited hereinabove are hereby incorporated by reference into the present specification.

It thus will be seen that the objects of this invention have been fully and effectively accomplished. It will be understood, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A vehicle seat integrated to selectively provide an adult seat in an adult seat mode and a child's seat in a child seat mode comprising a seat cushion assembly constructed and arranged to mounted on a vehicle in a position to enable an adult occupant of the vehicle to sit thereon, a seat back support assembly mounted with respect to said seat cushion assembly so as to be disposed in an operative fixed relation therewith, a plurality of cushion assemblies mounted on said seat back support assembly including i) side cushions carried by said seat back support assembly in positions spaced apart a distance sufficient to define a child receiving space between said side cushions of a size to enable a child to be disposed between said side cushions ii) a movable cushion assembly constructed and arranged with respect to said seat back support assembly to be moved between (1) an adult mode position wherein said plurality of cushion assemblies including said movable cushion assembly are disposed within the space between the side cushions and provide therewith a cushioned adult back support for engaging the back of an adult seat occupant sitting on the seat cushion assembly, and (2) a child mode position wherein said movable cushion assembly extends from the space between the side cushions in overlying relation to the seat cushion assembly and said plurality of cushion assemblies including said movable cushion assembly provide a cushioned child's seat extending from the bottom of the space in overlying relation to the seat cushion assembly, iii) a cushioned child's seat back extending upwardly from said cushioned child's seat within the space between said side cushions and providing a support surface when engaged by the child's back, and iv) a cushioned child's head support above the cushioned child's seat back, a child's seat belt assembly constructed and arranged to be operable when said movable seat assembly is in the child mode position thereof to be manually moved between (1) a restraint condition enabling a child in a sitting position on said cushioned child's seat to be restrained thereby and (2) a released condition enabling (A) entry of a child into a sitting position on said cushioned child's seat preparatory to restraint or (B) exit of a child from a sitting position on said cushioned child's seat after restraint, said child's seat belt assembly including a pair of shoulder belts extending from said cushioned child's seat back over the shoulders of a child in a sitting position on said cushioned child's seat, and a belt supporting structure disposed rearwardly of said support surface and constructed and arranged to support a generally upper portion of said shoulder belts at a position rearwardly of said support surface in such fashion that each of said shoulder belts, when said child's seat belt assembly is in said restraint condition, includes a generally straight portion which extends i) forwardly from said position rearwardly of said support surface, ii) through an associated wedge-shaped space extending generally from a plane of skid support surface towards said supporting structure, and iii) to a position adjacent the child's shoulder, said belt supporting structure supporting said generally upper portion of each of the shoulder belts rearwardly of said support surface in such physical relation to said associated wedge-shaped space so as to enable said shoulder belts to retain said straight portions thereof extending from said position rearwardly of said support surface to said position adjacent the shoulder for all children within a predetermined size range, such that said straight portions extend generally horizontally from said position rearwardly of said support surface to said position adjacent the child's shoulder with no forward and upward extent for a largest child within said range, and such that said straight portions extend downwardly and forwardly from said position rearwardly of said support surface to said position adjacent the child's shoulder without any ear interference for a smallest child within said range, said belt supporting structure supporting said generally upper portion of each of the shoulder belts rearwardly of said support surface in such physical relation to said associated wedge-shaped space so as to automatically accommodate all children between said smallest child and said largest child by enabling said straight portions of said shoulder belts to be moved from the horizontal for said largest child to progressively lower levels at progressively greater angles to the horizontal as the particular child held in the restrain condition of said child's seat belt assembly is of progressively diminishing size within said range, each said wedge-shaped space constituting a space through which the associated one of straight portions moves as said straight portions are moved from the horizontal to said progressively lower levels at progressively greater angles to the horizontal as the particular child held in the restrain condition of said child's seat belt assembly is of progressively diminishing size within said range.

2. A vehicle seat as defined in claim 1 wherein said movable cushion assembly includes a frame structure constructed and arranged to extend generally forwardly from a lower portion of the seat back support assembly when said movable cushion assembly is in the child mode position thereof, a structural connection between said frame structure and said seat back support assembly constructed and arranged to enable said movable cushion assembly to be moved between said adult mode and child mode positions, said movable cushion assembly including cushioning material attached to said frame structure in a position to be disposed (1) generally beneath said frame structure when said movable cushion assembly is in said child mode position and (2) generally forwardly of said frame structure between said side cushions when said movable cushion assembly is in said adult mode position, said child's seat belt assembly when in said restraint condition with respect to a child in a sitting position on said cushioned child's seat extending downwardly between the legs of the child to a restraint point provided by said frame structure.

3. A vehicle seat as defined in claim 2 wherein said child's seat belt assembly when in said restraint condition also includes lap belt portions constructed and arranged to be restrained separately at opposite sides of said movable cushion assembly and together at the lap of a child being restrained.

4. A vehicle seat as defined in claim 3 wherein said seat back support assembly includes a seat back frame structure to which said side cushions are attached and a back panel of a size to fit within the space between the side cushions fixedly mounted on said seat back frame structure forwardly thereof within a rearward portion of the space between the side cushions, said plurality of cushion assemblies including a head support cushion assembly mounted on said seat back frame structure in a position to extend above the space between said side cushions, and a removable cushioned pad including a seat portion detachably fixed to the frame structure of said movable cushion so as to form with said movable cushion assembly said cushioned child's seat assembly and a back portion detachably fixed to said back panel so as to extend to said head support cushion so as to form with said back panel and said head support cushion the cushioned child's seat back and head support, the frame structure of said movable cushion assembly being pivoted to said back panel so that said back panel, said movable cushion and said cushioned pad constitute a child seat module.

5. A vehicle seat as defined in claim 4 wherein said back panel and said removable cushioned pad have openings therein through which the straight shoulder belt portions extend.

6. A vehicle seat as defined in claim 5 wherein said belt supporting structure comprises a pair of horizontally spaced and horizontally aligned bale portions provided on said seat back frame structure rearwardly of a surface of said back panel engaged by said removable cushioned pad.

7. A vehicle seat as defined in claim 6 wherein said belt supporting structure is fixed to said seat back frame and said back panel, and wherein each of said straight shoulder belt portions is integral with a belt portion extending downwardly from an associated position of restraint provided by a bracket fixed to said seat back frame structure and said back panel.

8. A vehicle seat as defined in claim 6 wherein each of said straight shoulder belt portions has a rearward end fixed to said bale portions.

9. A vehicle seat as defined in claim 5 wherein the openings in said back panel which receive said straight shoulder belt portions are open to an upper end of said back panel, said removable cushioned pad having portions above the openings therein including free ends detachably connected to adjacent pad portions.

10. A vehicle seat as defined in claim 4 wherein said belt supporting structure comprises a pair of reels rotatably supported by said seat back frame structure, each of said straight shoulder belt portions being integral with a belt portion wrapped around an associated one of said reels, each of said straight shoulder belt portions extending from an associated position of restraint tangentially beneath the associated portion wrapped around the associated reel.

11. A vehicle seat as defined in claim 1 wherein each of said straight shoulder belt portions is restrained to extend to one of a pair of horizontally spaced and horizontally aligned bale portions provided on said seat back support assembly rearwardly of said support surface.

12. A vehicle seat as defined in claim 11 wherein each of said straight shoulder belt portions is integral with a belt portion extending downwardly from an associated position of restraint provided by said belt supporting structure in the form of a bracket carrying said belt portions and fixed to said seat back support assembly.

13. A vehicle seat as defined in claim 11 wherein each of said straight shoulder belt portions has a rearward end fixed at an associated position of restraint on said belt supporting structure, said belt supporting structure being fixed to said seat back support assembly.

14. A vehicle seat as defined in claim 1, wherein a discontinuity in a plane of paid supporting surface generally defines one side of said wedge-shaped space, and wherein said discontinuity has a vertical length of approximately 2".

15. A vehicle seat as defined in claim 1, wherein said belt supporting structure comprises a pair of laterally spaced reels, said upper portion of said shoulder belts being wound on said reels, and wherein said straight portions of said belts extend forwardly from said upper portion of said shoulder belts wound on said reels to said position adjacent the child's shoulders.

16. A vehicle seat as defined in claim 1, wherein said belt supporting structure comprises a bracket having a pair of laterally spaced belt-engaging portions, said shoulder belts having a portion thereof disposed behind said support surface extending upwardly towards said bracket and over said bracket to enable said bracket to support said upper portion of said shoulder belts, and wherein said straight portions of said belts extend forwardly form said upper portion of said shoulder belts supported by said belt engaging portions to said position adjacent the child's shoulders.

17. A vehicle seat according to claim 1, wherein said seat back support assembly includes a back panel sized to fit within the space between the side cushions, said back panel providing support for a removable cushioned pad back portion, said removable cushioned pad back portion providing cushioning for the cushioned child's seat back, said back panel having a generally vertical extent defining a general vertical contour of said cushioned child's seat back, said back panel having a pair of laterally spaced generally wedge-shaped wall portions, each of said generally wedge-shaped wall portions generally defining one of said wedge-shaped spaces.

18. A vehicle seat according to claim 17, wherein each of said wedge-shaped wall portions includes a generally horizontally extending top wall portion and a bottom wall portion extending upwardly and rearwardly from said generally vertical extent.

19. A vehicle seat according to claim 1, wherein said wedge-shaped space is unobstructed and extents generally from said plane of the support surface towards a point adjacent said belt supporting structure.

* * * * *